Oct. 14, 1958     L. GOODMAN     2,855,705
PLASTIC HEELS HAVING REINFORCING METALIC INSERTS
Filed March 25, 1958     4 Sheets-Sheet 1
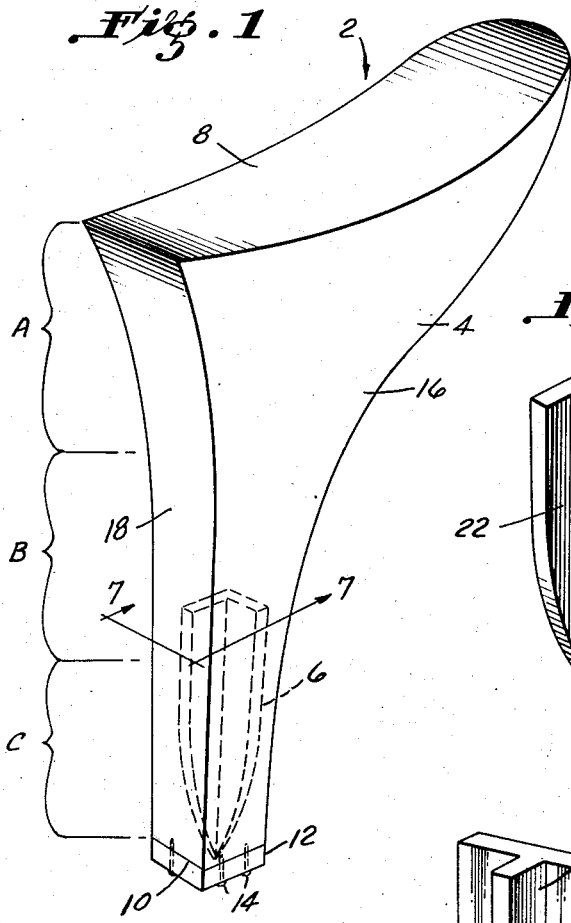
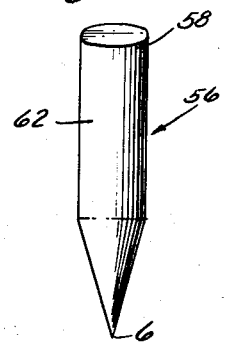
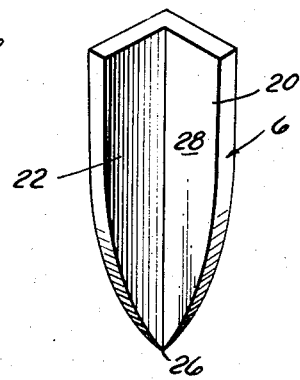
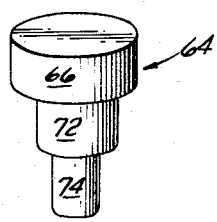
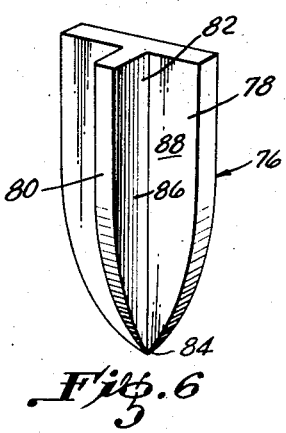
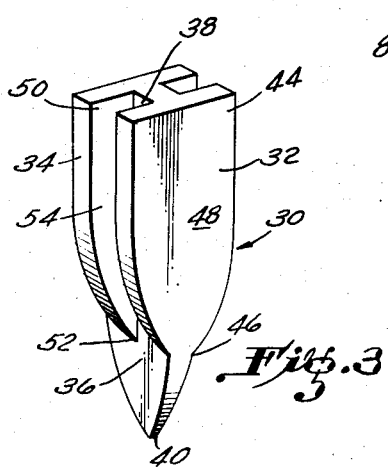
INVENTOR
Leonard Goodman
BY
ATTORNEYS Oct. 14, 1958  L. GOODMAN  2,855,705
PLASTIC HEELS HAVING REINFORCING METALIC INSERTS
Filed March 25, 1958  4 Sheets-Sheet 2
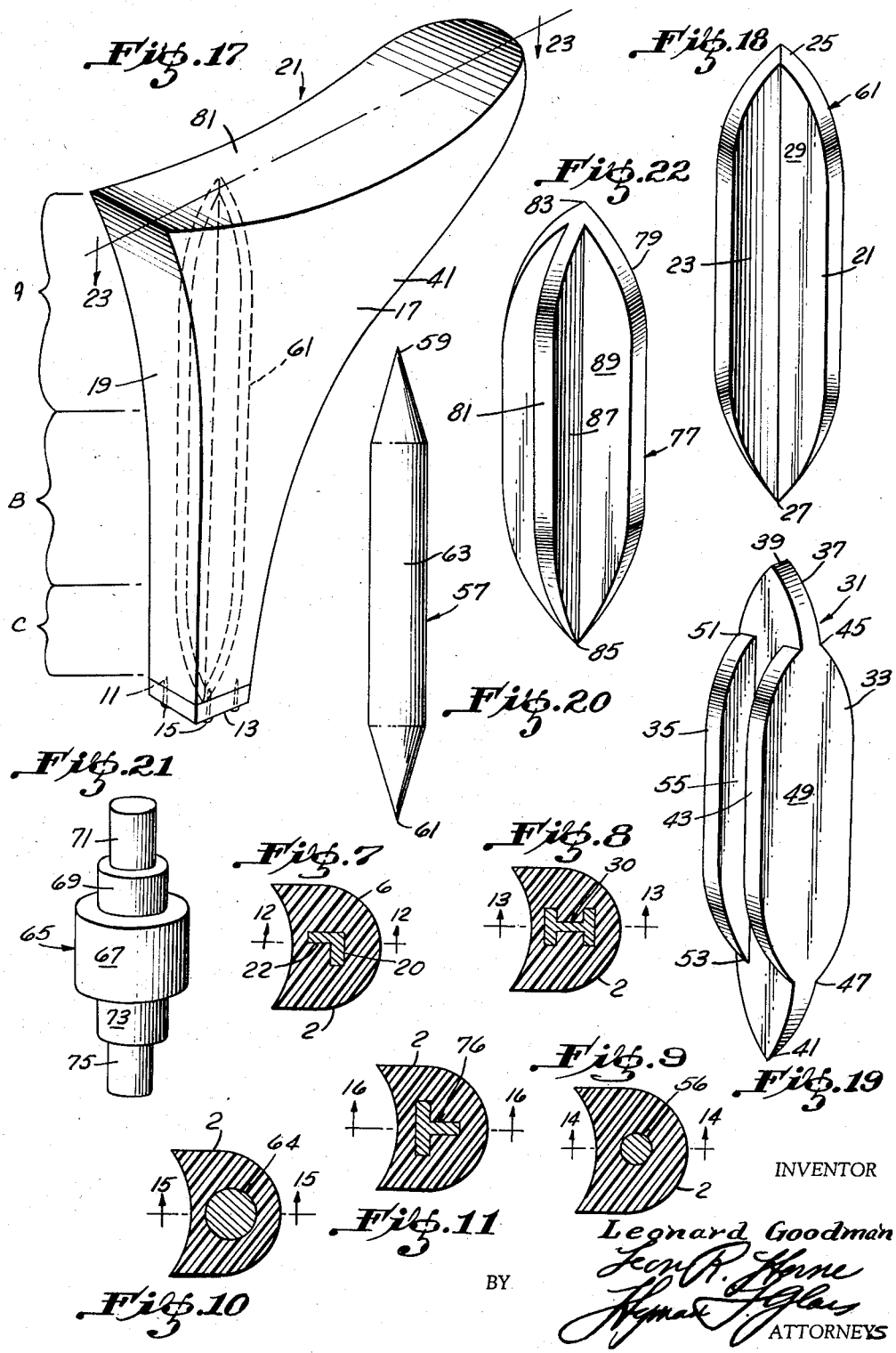
INVENTOR
Leonard Goodman
BY
ATTORNEYS Oct. 14, 1958 L. GOODMAN 2,855,705
PLASTIC HEELS HAVING REINFORCING METALIC INSERTS
Filed March 25, 1958 4 Sheets-Sheet 3
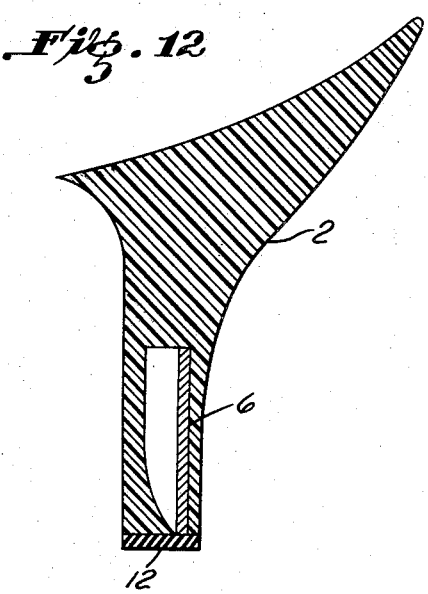
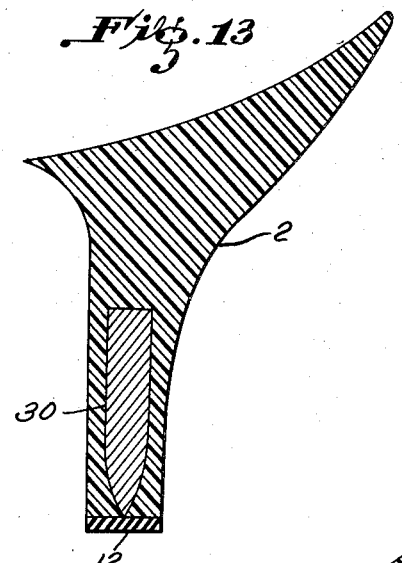
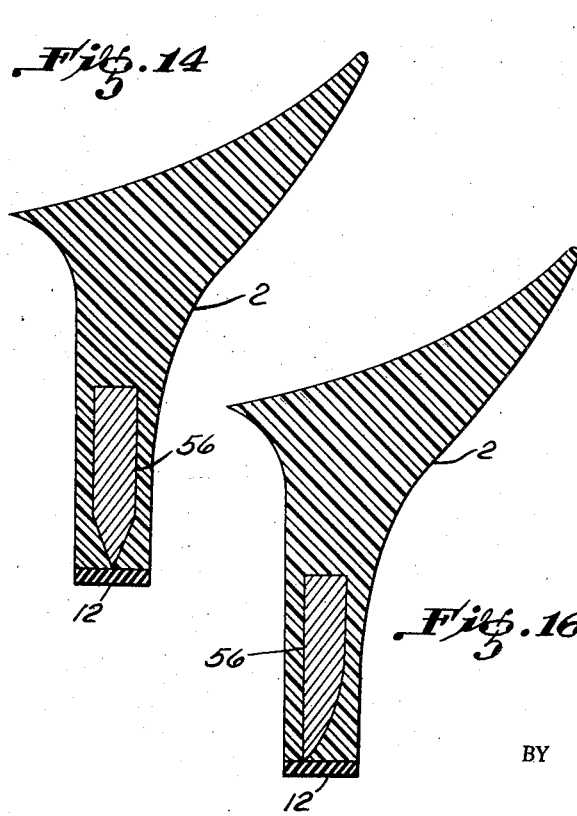
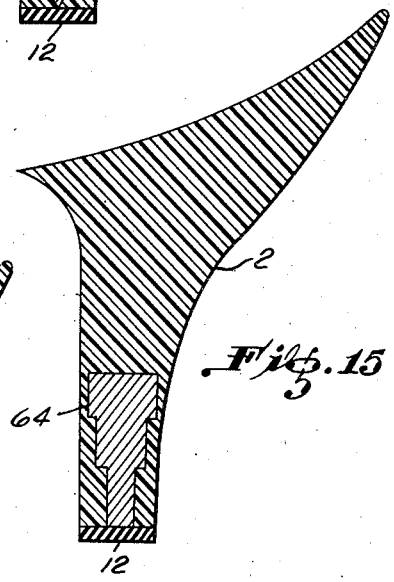
INVENTOR
Leonard Goodman
BY
ATTORNEYS INVENTOR
Leonard Goodman
BY
ATTORNEYS

United States Patent Office 2,855,705
Patented Oct. 14, 1958

2,855,705

PLASTIC HEELS HAVING REINFORCING METALLIC INSERTS

Leonard Goodman, Leominster, Mass., assignor to Foster Grant Co., Inc., Leominster, Mass., a corporation of Delaware Application March 25, 1958, Serial No. 723,735

4 Claims. (Cl. 36—34)

This invention relates to a molded and reinforced heel for women's shoes.

Presently known style-conforming heels for women's shoes are rather high and have relatively small lifts and are easily broken or cracked during normal wear. Because of the relatively small size or cross-sectional area of the lifts for such heels, it has been heretofore found necessary to reinforce such heels by means of a hollow insert positioned into a bore of the body of the heel starting at the tread end face and extending toward the attaching face for about one half to two thirds of the length of the heel and also to use this hollow insert as a means for attaching a new lift. In such cases, a new lift is attached to a shank member which is of such dimensions that it can be snugly fitted within the hollow insert, and, upon the shank being so positioned within the hollow insert, the lift will be positioned flush with the tread end face of the heel.

The woman's shoe heel of this invention comprises a high impact strength plastic material molded about a reinforcing metallic member extending from at least the portion of the heel intermediate the heel attaching face and the heel tread end face and progressively decreasing in cross-sectional area from that intermediate portion towards said tread end face. The reinforcing metallic member comprises essentially a modified structural shape, viz., channel, I-beam, T-beam, rod, and the modification consists in that it is tapered at at least one end thereof, viz., the end approaching the tread end face of the heel. The intermediate portion of the heel is that portion of the heel having a cross-sectional area substantially smaller than the cross-sectional area of the portion of the heel towards the attaching face and substantially greater than the cross-sectional area of that portion of the heel towards the tread end face. In some known style-conforming heels the height or length of the portion of the heel from the attaching face to the points of beginning of the intermediate portion and the height or length of the intermediate portion of the heel are each approximately the same as the height or length of the portion of the heel from the points of ending of the intermediate portion to the tread end face. In other known style-conforming heels, the height or length of the portion of the heel from the attaching face to the points of beginning the intermediate portion and the height or length of the intermediate portion are each smaller than the height or length of the portion of the heel from the points of ending of the intermediate portion to the tread end face. Structurally shaped metallic members of the type hereinabove set forth are known to be capable of withstanding maximum stresses when subjected to shock, and I have, for the first time, presented here a style-conforming heel using such modified structural members as reinforcing inserts in combination with high impact strength plastic material. The modification is in the presence of at least one end portion being tapered especially in at least that portion of the heel having the smallest cross-sectional area and being tapered towards the tread end face. Thus, that portion of the heel having the smaller overall cross-sectional area will still have the maximum possible resistance to breaking when subjected to shock and will still allow for fast attachment of the lift to the tread end face since the tapered portion of the insert will allow for easy nailing of the lift to the tread end face in view of the fact that the insert will not interfere with the nails.

As is well known, the intermediate and lower portions of the heel are subjected to the greatest stresses because of the tendency of the heel to be subjected to the greatest number of shocks at said portions thereof by the wearer of the shoe, and this is due to the tendency of the wearer to cause the heel to be contacted against sharp edges such as are found in sidewalk curbs. I have found that a heel of high impact strength plastic material having in its portion of smallest cross-sectional area and at least partially in the intermediate portion a modified structurally shaped insert will resist shock, and breaking as a result thereof, to a much greater extent than a heel without the modified structurally shaped insert. Further, I have found that, by tapering the insert as hereinbefore set forth, the heel will not lose any of its resistance to breaking for the reason that surface area and the volume of the insert exposed to shock is proportional to the surface area and volume of the portion of the plastic material exposed to shock.

Also, the insert can be the height or length of the heel and be tapered towards the attaching face from the points of beginning of the intermediate portion to the attaching face. In this case, the tapered portion will allow for easy nailing without interference with the insert while at the same time reinforcing the heel at that portion thereof without decreasing the shock resistance value of the heel at that portion because of the large cross-sectional area of that portion.

The novel heel of this invention is capable of being mass produced by means of any of the well known turret type injection molding machines such as one in which a plurality of heel molds is positioned on a revolving table, each of the reinforcing metal inserts is positioned in a mold at one position, and the table is then caused to be turned or partly revolved by an indexing mechanism to another position of each mold, at which position the plastic material is injected into a mold from one of a plurality of peripherally spaced injectors above the table.

The plastic material here utilized for the heel is preferably polystyrene, a physical blend of polystyrene and natural or synthetic rubber, a graft copolymer of styrene upon a synthetic or natural rubber, the synthetic or natural rubber being present in the amount of approximately three to twenty, and preferably about seven, percent, or nylon. The impact strength of the plastic material, viz. the number of foot-pounds required for the fracture of a test specimen in accordance with the widely accepted Izod test for the determination of impact strength, is between 0.3 and 1.5, and preferably between 1.0 and 1.2.

An object of this invention is to provide a high impact strength molded and reinforced shoe heel which has great and substantially equal resistance to breaking at all sections thereof.

Another object of this invention is to provide a high impact strength molded shoe heel reinforced for at least that portion of its height which has the smallest cross-sectional area.

Another object of this invention is to provide a high impact strength molded shoe heel reinforced with a modified structurally shaped insert for at least that portion of its height having the smallest cross-sectional area.

Another object of this invention is to provide a high impact strength molded and reinforced shoe heel which can be easily fastened to a shoe upper at its attaching face and to which a lift can be easily fastened to its tread end face.

Another object of this invention is to provide a high impact strength molded and reinforced shoe heel which can be mass produced by known injection molding techniques.

Another object of this invention is to provide a high impact strength molded shoe heel reinforced for its entire height which can be molded in a single molding operation.

Other objects and features will become readily apparent from the following detailed description which is illustrative of the preferred embodiments of my invention.

Figure 1 is a view in perspective of one embodiment of my high impact strength molded woman's shoe heel including the angle-shaped reinforcing member extending from the intermediate portion of the heel to the tread end face and the lift fastened thereto at the tread-end face.

Figure 2 is a view in perspective of one embodiment of an angle-shaped reinforcing member, said member having a cross-sectional area greater at the top portion than the cross-sectional area at its end portion.

Figure 3 is a view in perspective of one embodiment of an I-shaped reinforcing member, said member having a cross-sectional area greater at the top portion than the cross-sectional area at its end portion.

Figure 4 is a view in perspective of one embodiment of a cylindricallly shaped reinforcing member having a cross-sectional area greater at its top portion than at its end portion.

Figure 5 is a view in perspective of another embodiment of a cylindrically shaped reinforcing member having a cross-sectional area greater at its top portion than at its end portion.

Figure 6 is a view in perspective of one embodiment of a T-shaped reinforcing member having a cross-sectional area greater at its top portion than at its end portion.

Figure 7 is a sectional view taken on line 7—7 of Figure 1.

Figure 8 is a sectional view taken on line 7—7 of Figure 1 wherein the I-shaped reinforcing member of Figure 3 is utilized instead of the angle-shaped reinforcing member of Figure 2.

Figure 9 is a sectional view taken on line 7—7 of Figure 1 wherein the cylindrically shaped reinforcing member of Figure 4 is utilized instead of the angle-shaped reinforcing member of Figure 2.

Figure 10 is a sectional view taken on line 7—7 of Figure 1 wherein the cylindrically shaped reinforcing member of Figure 5 is utilized instead of the angle-shaped reinforcing member of Figure 2.

Figure 11 is a sectional view taken on line 7—7 of Figure 1 wherein the T-shaped reinforcing member of Figure 6 is utilized instead of the angle-shaped reinforcing member of Figure 2.

Figure 12 is a sectional view taken on line 12—12 of Figure 7.

Figure 13 is a sectional view taken on line 13—13 of Figure 8.

Figure 14 is a sectional view taken on line 14—14 of Figure 9.

Figure 15 is a sectional view taken on line 15—15 of Figure 10.

Figure 16 is a sectional view taken on line 16—16 of Figure 11.

Figure 17 is a view in perspective of another embodiment of my high impact strength molded woman's shoe heel including the angle-shaped reinforcing member extending from the attaching face to the thread end face and the lift fastened thereto at the thread-end face.

Figure 18 is a view in perspective of another embodiment of an angle-shaped reinforcing member having a cross-sectional area greater at a portion thereof intermediate its ends than the cross-sectional area at each of its respective ends.

Figure 19 is a view in perspective of another embodiment of an I-shaped reinforcing member having a cross-sectional area greater at a portion thereof intermediate its ends than the cross-sectional area at each of its respective ends.

Figure 20 is a view in perspective of another embodiment of a cylindrically shaped reinforcing member having a cross-sectional area greater at a portion thereof intermediate its ends than the cross-sectional area at each of its respective ends.

Figure 21 is a view in perspective of another embodiment of a cylindrically shaped reinforcing member having a cross-sectional area greater at a portion thereof intermediate its ends than the cross-sectional area at each of its respective ends.

Figure 22 is a view in perspective of another embodiment of a T-shaped reinforcing member having a cross-sectional area greater at a portion thereof intermediate its ends than the cross-sectional area at each of its respective ends.

Figure 23:
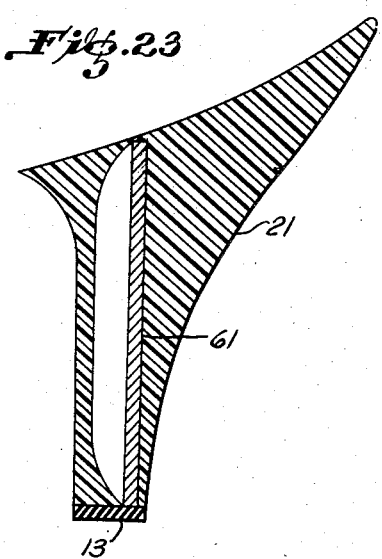
Figure 23 is a sectional view taken on line 23—23 of Figure 17.

More specifically, with respect to the embodiment of the heel of Figure 1, said high impact strength molded shoe heel 2 consists of the high impact strength plastic material 4 molded about the reinforcing insert member 6, preferably of a metal such as a high or low carbon steel, stainless steel, or any other metal which can be easily shaped by any well known metal bending means, viz., a brake. The heel 2 has a concave attaching face 8 at which it is attached to the heel portion of the sole of a shoe (not shown) and a tread end face 10 to which the lift 12 is attached by means of ordinary fastening tacks 14. Also, the heel 2, which is the currently style-conforming high and sharp pointed type heel, has the outer face 16 and the inner face 18.

In the embodiment of Figure 1, the reinforced plastic heel is one in which the portion having the greatest cross-sectional area is designated by A, the intermediate portion is designated as B, and the portion having the smallest cross-sectional area is designated as C. The height or length of portion A is approximately the same as the height or length of each of the other two portions B and C. In the heel of this embodiment, the insert is preferably one which extends from the intermediate portion to the tread end face and is tapered towards the tread end face, as is clearly shown in the appended drawings.

Referring to Figures 1, 2 and 7, the reinforcing member is an angle-shaped member 6 consisting of the sides 20 and 22, being shown at a 90° angle to each other, although it is within the scope of this invention to use an angle-shaped reinforcing member having sides at an angle greater or less than 90° to one another. Each of the sides 20 and 22 are tapered both towards the bottommost point 26 from the portion 28 thereof intermediate said top edges 24 and the bottommost point 26.

Referring to Figures 3 and 8, the reinforcing member is a substantially I-shaped member 30 consisting of the top and bottom legs 32 and 34 and the connecting member 36 perpendicular to said legs 32 and 34. The member 36 is tapered towards its bottommost point 40 from the portion thereof intermediate the top 38 and bottom point 40; the leg 32 is tapered towards bottommost point 46 from its portion 48 intermediate the top portion 44 and the bottom point 46, said point 46 being at the point of beginning of the tapered portion of the connecting member 36; and the leg 34 is tapered towards its bottommost point 52 from its portion 54 intermediate the top portion 50 and bottom point 52, said point 52 being at the point of beginning of the tapered portion of the connecting member 36, as clearly shown in Figure 3 of the drawings.

Now, with reference to Figures 4 and 9, the reinforcing member is a cylindrically shaped member 56 tapered towards its bottommost point 60 from its intermediate portion 62 intermediate its top portion 58 and bottom point 60.

The reinforcing member 64 of Figures 5 and 10 consists of the stepped cylindrical portions 66, 72, and 74, the cross-sectional area of portion 66 being greater than that of portion 72, which, in turn, has a cross-sectional area greater than that of 74, as clearly shown in Figure 5.

The reinforcing member of Figures 6 and 11 is a T-shaped member 76 having the head portion 78 and the leg portion 80. The leg portion 80 is tapered towards the bottommost point 84 of the head portion 78 from its intermediate portion 86, and the head portion is likewise tapered from its intermediate portion 88 towards the bottommost point 84, as clearly shown in the appended drawings. The top portion 82 of member 76 is not tapered.

Another embodiment of my reinforced molded plastic heel is shown in Figure 17, and the top and intermediate portions A and B, respectively, each have a greater height or length than does bottom portion C, which has a cross-sectional area smaller than that of portion B which, in turn, has a cross-sectional area smaller than that of A. In this embodiment the insert tapers from the intermediate portion thereof both towards the attaching face and towards the tread end face and extends for the length of the heel, as clearly shown in the appended drawings.

The high impact strength molded shoe heel 21 consists of the high impact strength plastic material 41 molded about the reinforcing insert member 61, preferably of a metal such as a high or low carbon steel, stainless steel, or any other metal which can be easily shaped by any well known metal bending means, viz., a brake. The heel 21 has a concave attaching face 81 at which it is attached to the heel portion of the sole of a shoe (not shown) and a tread end face 11 to which the lift 13 is attached by means of ordinary fastening tacks 15. Also, the heel 21, which is the currently style-conforming high and sharp pointed type heel, has the outer face 17 and the outer face 19.

Referring to Figures 17, 18, and 23, the reinforcing member is an angle-shaped member 61 consisting of the sides 21 and 23, being shown at a 90° angle to each other, although it is within the scope of this invention to use an angle-shaped reinforcing member having sides at an angle greater or less than 90° to one another. Each of the sides 21 and 23 are tapered both towards the topmost and bottommost points 25 and 27, respectively, from the portion 29 thereof intermediate said top and bottom points 25 and 27.

Figure 24:
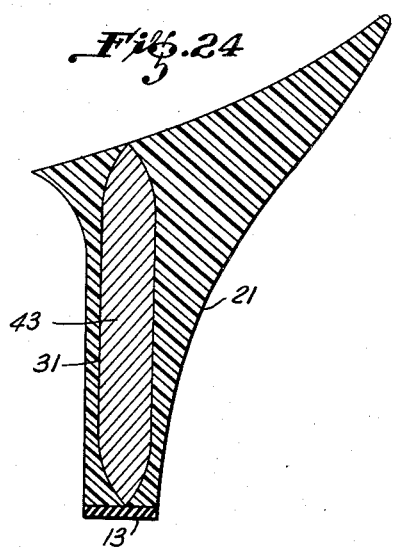
Figure 24 is a sectional view taken on line 23—23 of Figure 17 wherein the I-shaped reinforcing member of Figure 19 is utilized instead of the angle-shaped reinforcing member of Figure 18.

Referring to Figures 19 and 24, the reinforcing member is a substantially I-shaped member 31 consisting of the top and bottom legs 33 and 35 and the connecting member 37 perpendicular to said legs 33 and 35. The member 37 is tapered both towards its topmost and bottommost points 39 and 41 from the portion 43 thereof intermediate said top and bottom points 39 and 41; the leg 33 is tapered towards its topmost and bottommost points 45 and 47 from its portion 49 intermediate said points 45 and 47, said points 45 and 47, respectively, being at the points of beginning of the respective tapered portions of the connecting member 37; and the leg 35 is tapered towards its topmost and bottommost points 51 and 53 from its portion 55 intermediate said points 51 and 53, said points 51 and 53, respectively, being at the points of beginning of the respective tapered portions of the connecting member 39, as clearly shown in Figure 19 of the drawings.

Figure 25:
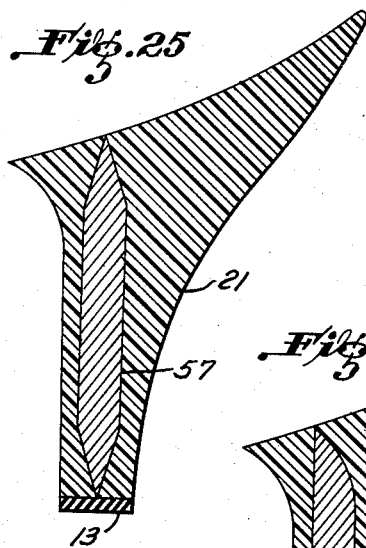
Figure 25 is a sectional view taken on line 23—23 of Figure 17 wherein the cylindrically shaped reinforcing member of Figure 20 is utilized instead of the angle-shaped reinforcing member of Figure 17.

Now, with reference to Figures 20 and 25, the reinforcing member is a cylindrically shaped member 57 tapered both towards its topmost and bottommost points 59 and 61 from its intermediate portion 63 intermediate said top and bottom points 59 and 61.

Figure 26:
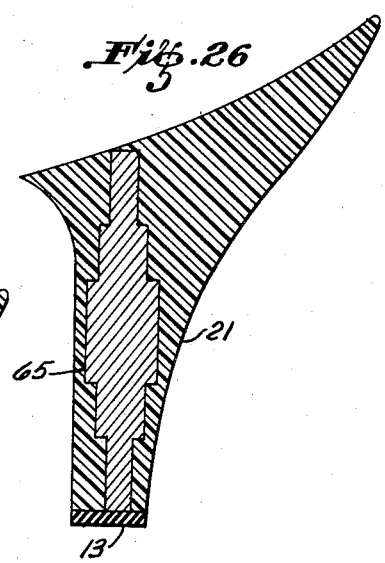
Figure 26 is a sectional view taken on line 23—23 of Figure 17 wherein the cylindrically shaped reinforcing member of Figure 21 is utilized instead of the angle-shaped reinforcing member of Figure 17.

The reinforcing member 65 of Figures 21 and 26 consists of the stepped cylindrical portions 67, 69, 71, 73, and 75, the cylindrical portions 69 and 73 being equal in cross-sectional area, and the cylindrical portions 71 and 75 being equal in cross-sectional area, the cross-sectional area of intermediate portion 67 being greater than that of portions 69 and 73, each of which, in turn, has a cross-sectional area greater than that of 71 and 75, as clearly shown in Figure 21.

Figure 27:
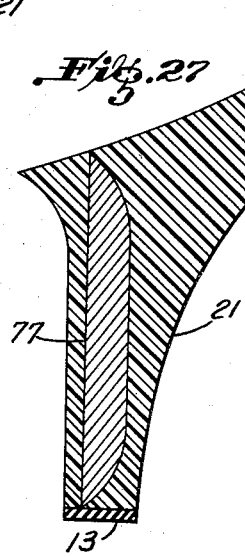
Figure 27 is a sectional view taken on line 23—23 of Figure 17 wherein the T-shaped reinforcing member of Figure 22 is utilized instead of the angle-shaped reinforcing member of Figure 17.

The reinforcing member of Figures 22 and 27 is a T-shaped member 77 having the head portion 79 and the leg portion 81. The leg portion 81 is tapered both towards the topmost and bottommost points 83 and 85 of the head portion 79 from its intermediate portion 87, and the head portion is likewise tapered from its intermediate portion 89 toward the topmost and bottommost points 83 and 85, as clearly shown in the appended drawings.

As is clearly evident here, I have provided a high impact strength molded heel to which there has been introduced a high degree of tensile strength both by means of the reinforcing member and by use of the high impact strength plastic material. Further, by utilizing a structurally shaped reinforcing member of greater cross-sectional area at one portion thereof than at the end portion thereof, I have been able to produce a molded plastic heel having maximum strength at all portions thereof along the entire length thereof and at the same time having sufficient area at at least the tread end face for easy fastening by conventional means of the lift to the tread end face.

Many alterations and changes may be made without departing from the spirit and scope of this invention which is set forth in the appended claims which are to be construed as broadly as posible in view of the prior art.

I claim:

1. A high impact strength molded shoe heel comprising high impact strength plastic material and a structurally shaped reinforcing member positioned therewithin, said structurally shaped reinforcing member extending from at least the intermediate portion of the heel to the tread end face of the heel, said reinforcing member having a greater cross-sectional area at said intermediate portion of the heel than at the portion thereof at said tread end face, the surface area and volume of said structurally shaped reinforcing member being tapered to the tread face of the heel, whereby said heel has maximum resistance to breaking at all portions thereof and a lift may be easily fastened to said plastic material at its tread end face.

2. A high impact strength molded shoe heel comprising high impact strength plastic material and a structurally shaped reinforcing member positioned therewithin extending from at least the intermediate portion of the heel to the tread end face of the heel, said reinforcing member being tapered inwardly of the outer heel faces from said intermediate portion of the heel to said tread end face of the heel, whereby a lift may be easily fastened to the tread end face and whereby said heel has maximum resistance to breaking at all portions thereof.

3. A high impact strength molded shoe heel comprising high impact strength plastic material and a structurally shaped reinforcing member positioned therewithin, said plactic material being in substantial contact with said reinforcing member at all portions of said member, said member extending from at least the intermediate portion of the heel to the tread end face of the heel and being tapered inwardly of the outer heel faces from said intermediate portion of the heel to said tread end face of the heel, whereby a lift may be easily fastened to the tread end face and whereby said heel has maximum resistance to breaking at all portions thereof.

4. A high impact strength molded shoe heel comprising high impact strength plastic material and a structurally shaped reinforcing member positioned therewithin, said structurally shaped reinforcing member extending from at least the intermediate portion of the heel to the tread end face of the heel, said reinforcing member having a greater cross-sectional area at said intermediate portion of the heel than at the portion thereof at said tread end face, the surface area and volume of said structurally shaped reinforcing member being tapered to a single point at said tread face of the heel, whereby said heel has maximum resistance to breaking at all portions thereof and a lift may be easily fastened to said plastic material at its tread end face.

References Cited in the file of this patent

UNITED STATES PATENTS

| 2,069,585 | Marchant | Feb. 2, 1937 |

FOREIGN PATENTS

| 98,908 | Sweden | May 14, 1940 |

OTHER REFERENCES

"Modern Plastic Encyclopedia," vol. 34, 1956; Plastic Dig. (pages 37–40).

"American Shoemaking" publication, pages 100 and 101, Feb. 6, 1957. Copy in Div. 11.